(12) United States Patent
Gane et al.

(10) Patent No.: US 9,175,442 B2
(45) Date of Patent: Nov. 3, 2015

(54) PROCESS FOR MANUFACTURING COATED SUBSTRATES

(75) Inventors: Patrick A. C. Gane, Rothrist (CH); Catherine Jean Ridgway, Muhlethal (CH); Michel Schenker, Oftringen (CH)

(73) Assignee: Omya International, Oftringen (CH)

( * ) Notice: Subject to any disclaimer, the term of this patent is extended or adjusted under 35 U.S.C. 154(b) by 0 days.

(21) Appl. No.: 14/117,941

(22) PCT Filed: May 21, 2012

(86) PCT No.: PCT/EP2012/059374
§ 371 (c)(1),
(2), (4) Date: Dec. 31, 2013

(87) PCT Pub. No.: WO2012/163711
PCT Pub. Date: Dec. 6, 2012

(65) Prior Publication Data
US 2014/0302337 A1      Oct. 9, 2014

Related U.S. Application Data

(60) Provisional application No. 61/495,453, filed on Jun. 10, 2011.

(30) Foreign Application Priority Data

Jun. 3, 2011    (EP) .................................... 11168651

(51) Int. Cl.
| | | |
|---|---|---|
| *D21H 19/80* | (2006.01) | |
| *B41M 5/42* | (2006.01) | |
| *B41M 5/50* | (2006.01) | |
| *B41M 5/52* | (2006.01) | |
| *B05D 7/00* | (2006.01) | |

(52) U.S. Cl.
CPC .................. *D21H 19/80* (2013.01); *B05D 7/54* (2013.01); *B41M 5/426* (2013.01); *B41M 5/50* (2013.01); *B41M 5/506* (2013.01); *B41M 5/5236* (2013.01); *B41M 2205/38* (2013.01); *Y10T 428/31971* (2015.04); *Y10T 428/31993* (2015.04)

(58) Field of Classification Search
CPC ...... D21H 19/80; B41M 5/425; B41M 5/506; B41M 5/5236; B41M 5/50; B41M 2205/38; B05D 7/54; Y10T 428/31993; Y10T 428/31971
USPC ......... 428/532, 537.5; 427/402, 419.1, 419.5, 427/414, 407.1, 415
IPC ............... D21H 19/80; B05D 7/00; B41M 5/50
See application file for complete search history.

(56) References Cited

U.S. PATENT DOCUMENTS

| | | | |
|---|---|---|---|
| 6,183,596 B1 * | 2/2001 | Matsuda et al. ................... | 162/9 |
| 6,214,163 B1 | 4/2001 | Matsuda et al. | |
| 2002/0150736 A1 | 10/2002 | Quintens et al. | |
| 2004/0020410 A1 | 2/2004 | Gane et al. | |
| 2004/0219310 A1 * | 11/2004 | Ogata et al. ................ | 428/32.24 |

FOREIGN PATENT DOCUMENTS

| | | | |
|---|---|---|---|
| CN | 1181774 A | | 5/1998 |
| EP | 1188573 | * | 3/2002 |
| EP | 1188573 A2 | | 3/2002 |
| EP | 1211086 | * | 6/2002 |
| EP | 1211086 A1 | | 6/2002 |
| EP | 2070991 A1 | | 6/2009 |
| JP | 2011507986 A | | 3/2011 |
| WO | 9629369 A2 | | 9/1996 |
| WO | WO96/29369 | * | 9/1996 |
| WO | 9717207 A1 | | 5/1997 |
| WO | WO97/17207 | * | 5/1997 |
| WO | 0039222 A1 | | 7/2000 |
| WO | 0078552 A1 | | 12/2000 |
| WO | WO00/78552 | * | 12/2000 |
| WO | 2004083316 A1 | | 9/2004 |
| WO | 2010112519 A1 | | 10/2010 |
| WO | 2011001706 A1 | | 6/2011 |

OTHER PUBLICATIONS

The International Search Report dated Aug. 14, 2012 for PCT Application No. PCT/EP2012/059374.
Written Opinion of the International Searching Authority dated May 21, 2012 for PCT/EP2012/059374.
Office Action dated Mar. 13, 2015 for Canadian Application No. 2,837,912.
Office Action dated Jul. 3, 2014 for Chinese Application No. 201280027148.3.
Office Action dated Feb. 27, 2015 for Chinese Application No. 201280027148.3.
Office Action dated Feb. 3, 2015 for Japanese Application No. 2014-513118.
Office Action dated Feb. 10, 2015 for Russian Application No. 2013158317/(090784).
Decision on Grant for Russian Application No. 2013158317/(090784).
European Search Report dated Oct. 21, 2011 for Application No. EP11168651.5.

* cited by examiner

*Primary Examiner* — Leszek Kiliman
(74) *Attorney, Agent, or Firm* — Amster, Rothstein & Ebenstein LLP

(57) ABSTRACT

The present invention relates to a process for manufacturing coated substrates by providing a substrate, providing at least one mineral material, providing a polysaccharide material comprising one or more polysaccharides, coating the substrate with the at least one mineral material, and coating the resulting pre-coat layer of mineral material with the gel comprising one or more polysaccharides, as well as the coated substrate obtained by this process and its use.

46 Claims, 12 Drawing Sheets

(a)

(b)

(a)

(b)

(a)

(b)

(a)

(b)

(a)

(b)

(a)

(b)

PROCESS FOR MANUFACTURING COATED SUBSTRATES

CROSS-REFERENCE TO RELATED APPLICATIONS

This application is a U.S. national phase of PCT Application No. PCT/ EP2012/059374, filed May 21, 2012, which claims priority to European Application No. 11168651.5, filed Jun. 3, 2011 and U.S. Provisional Application No. 61/495,453, filed Jun. 10, 2011.

The present invention relates to a process for manufacturing coated substrates as well as to the coated substrates obtained by this process and their use.

It is a continuous goal to improve the properties of certain substrates, e.g. in paper making to provide papers having improved surface properties, e.g. in terms of surface smoothness and uniformity, as well as structural stability.

Significant stiffness advantage can, e.g. be achieved by the use of polysaccharides, be it as fillers or coatings. For example, nano- or microfibrillar cellulose is well-known in paper-making as a coating material as well as in the wet end, but is hampered by high cost and potentially wasteful use in typical wet end applications.

The use of nano- or microfibrillar cellulose in the paper/board making wet end strongly hinders web dewatering, adding extra cost either in drying or in slowing the paper machine, and if used as a surface treatment agent it shows poor coating holdout.

The solubility and fines nature of the material makes it inefficient to retain, and when retained it is generally inefficiently applied within the spatial distribution of the paper fibre matrix.

Loss of expensive material such as nano- or micro fibrillar cellulose into the fibre void matrix of a paper or board, therefore, needs to be avoided, and maximal structural integrity of the surface needs to be maintained.

Thus, the object of the present invention is a method to produce coated substrates having good surface properties, e.g. in terms of surface smoothness and uniformity, as well as structural stability, avoiding any undesired loss of material during the production.

It was surprisingly found that coating substrates with polysaccharide material in combination with a mineral material pre-coat, which is able to absorb such polysaccharide material, significantly improves the efficiency of the use of such material as well as the substrate quality, e.g. in terms of surface smoothness and uniformity, surface strength and bending stiffness, wherein permeability can be controlled easily by the ratio of pre-coat and polysaccharide material.

Mineral material pre-coats are generally known, e.g. from unpublished European patent application No. 10 168 352.2, but no indication can be found in the prior art to combine such mineral material pre-coats with polysaccharide material layers providing the above-mentioned improved characteristics of the resulting paper.

It was found that by using a mineral material pre-coat, the polysaccharides of the polysaccharide material do not pass through the surface of the substrate and can integrate themselves within the porous structure of the mineral material pre-coat providing excellent holdout and thin layer continuity essential in developing an efficient concentration of the polysaccharide at the surface of the substrate, which may be especially advantageous, e.g. in the case of nano-fibrillar cellulose, where the cellulosic material is held on the substrate surface by absorbing the nano fines fraction from the nano-fibrillar cellulose forming an in-situ composite layer.

Thus, the above problem is solved by a process for manufacturing coated substrates, which is characterized by the following steps:

providing a substrate,
providing at least one mineral material,
providing a polysaccharide material comprising one or more polysaccharides,
coating the substrate with the at least one mineral material to obtain a pre-coat layer of mineral material,
coating the pre-coat layer of mineral material with the polysaccharide material comprising one or more polysaccharides.

The observed effects appear to be linked to the well-known I-beam concept, wherein the beam in this case consists of a substrate, such as a paper sheet or board, experiencing high stresses along the axial fibres that are farthest from the neutral (unstressed) axis under bending.

According to the I-beam concept, which is usually used in construction, comparatively little material is needed in the area close to the neutral axis for bending stiffness, though of course it is necessary to have sufficient z-direction strength to resist delamination in printing, folding and gluing processes.

Instead of this concept being of a homogeneous material, one can envisage the I-beam as representing the sheet density distribution; the neutral axis runs along the centre of the web, which can be of relatively low density, and most of the high density material is concentrated in the outer planar surfaces.

The I-beam concept applies for nano- and microfibrillar cellulosic material as well as for other polysaccharides such as starch, etc., used in the present invention, i.e. the more structurally dense the material is, the greater the density differentiation needs to be between the outer strength-delivering and inner bulk structure layers for the stiffening effect to be maximised, whereas when the overall density is low (e.g. in uncalendered paper), the paper girder-like construction can be used to maximum benefit, and the outer layers can be maintained at low density.

Suitable substrates according to the present invention may be papers or boards, e.g. calendered or uncalendered papers or boards, and may be selected from the group comprising standard coated and uncoated paper, which may be woodfree or comprising wood (e.g. PlanoJet; Papyrus AB, Sweden).

Substrates which may be preferably used in the present invention are selected from the group comprising printing papers, writing papers, copy papers, publication papers, synthetic papers, non-woven products, board and packaging materials, constructional materials such as decorative papers and paperboard and surface finishings.

The mineral material which is used as a pre-coat on the substrate is preferably selected from the group comprising mineral pigments and fillers.

Especially preferably the mineral material is selected from the group comprising precipitated calcium carbonate (PCC), which may have vateritic, calcitic or aragonitic crystal structure; natural ground calcium carbonate (GCC), which may be selected from marble, limestone and/or chalk; surface modified calcium carbonate; dolomite; talc; bentonite; clay; magnesite; satin white; sepiolite, huntite, diatomite; silicates; titanium doxide; and mixtures thereof.

In an especially preferred embodiment, said mineral material is selected from the group comprising surface-modified calcium carbonates, more preferably surface-reacted calcium carbonates being a reaction product of natural calcium carbonate with carbon dioxide and one or more acids, wherein the carbon dioxide is formed in situ by the acid treatment and/or is supplied from an external source.

Preferably, the natural calcium carbonate used for this reaction is selected from the group comprising marble, chalk, calcite, dolomite, limestone and mixtures thereof. In a preferred embodiment, the natural calcium carbonate is ground prior to the treatment with an acid and carbon dioxide. The grinding step can be carried out with any conventional grinding device such as a grinding mill known to the skilled person.

Preferably, the surface-reacted natural calcium carbonate to be used in the present invention is prepared as an aqueous suspension having a pH measured at 20° C., of greater than 6.0, preferably greater than 6.5, more preferably greater than 7.0, even more preferably greater than 7.5.

In a preferred process for the preparation of the aqueous suspension, the natural calcium carbonate, either finely divided, such as by grinding, or not, is suspended in water. Preferably, the slurry has a content of natural calcium carbonate within the range of 1 wt % to 80 wt %, more preferably 3 wt % to 60 wt %, and even more preferably 5 wt % to 40 wt %, based on the weight of the slurry.

In a next step, an acid is added to the aqueous suspension containing the natural calcium carbonate. Preferably, the acid has a $pK_a$ at 25° C. of 2.5 or less. If the $pK_a$ at 25° C. is 0 or less, the acid is preferably selected from sulphuric acid, hydrochloric acid, or mixtures thereof. If the $pK_a$ at 25° C. is from 0 to 2.5, the acid is preferably selected from $H_2SO_3$, $H_2SO_4$, $H_3PO_4$, oxalic acid or mixtures thereof. The one or more acids can be added to the suspension as a concentrated solution or a more diluted solution. Preferably, the molar ratio of the acid to the natural calcium carbonate is from 0.05 to 4, more preferably from 0.1 to 2.

As an alternative, it is also possible to add the acid to the water before the natural calcium carbonate is suspended.

In a next step, the natural calcium carbonate is treated with carbon dioxide. If a strong acid such as sulphuric acid or hydrochloric acid is used for the acid treatment of the natural calcium carbonate, the carbon dioxide is automatically formed. Alternatively or additionally, the carbon dioxide can be supplied from an external source.

Acid treatment and treatment with carbon dioxide can be carried out simultaneously which is the case when a strong acid is used. It is also possible to carry out acid treatment first, e.g. with a medium strong acid having a $pK_a$ in the range of 0 to 2.5, followed by treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the acid treatment step and/or the carbon dioxide treatment step are repeated at least once, more preferably several times.

Subsequent to the acid treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural calcium carbonate as an aqueous suspension having a pH of greater than 6.0, preferably greater than 6.5, more preferably greater than 7.0, even more preferably greater than 7.5. If the aqueous suspension is allowed to reach equilibrium, the pH is greater than 7. A pH of greater than 6.0 can be adjusted without the addition of a base when stirring of the aqueous suspension is continued for a sufficient time period, preferably 1 hour to 10 hours, more preferably 1 to 5 hours.

Alternatively, prior to reaching equilibrium, which occurs at a pH greater than 7, the pH of the aqueous suspension may be increased to a value greater than 6 by adding a base subsequent to carbon dioxide treatment. Any conventional base such as sodium hydroxide or potassium hydroxide can be used.

Further details about the preparation of the surface-reacted natural calcium carbonate are disclosed in WO 00/39222 and US 2004/0020410 A1, the content of these references herewith being included in the present application.

In a preferred embodiment of the preparation of the surface-reacted natural calcium carbonate, the natural calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural calcium carbonate before adding the acid and/or carbon dioxide.

Alternatively, the silicate and/or silica and/or aluminium hydroxide and/or earth alkali aluminate and/or magnesium oxide component(s) can be added to the aqueous suspension of natural calcium carbonate while the reaction of natural calcium carbonate with an acid and carbon dioxide has already started. Further details about the preparation of the surface-reacted natural calcium carbonate in the presence of at least one silicate and/or silica and/or aluminium hydroxide and/or earth alkali aluminate component(s) are disclosed in WO 2004/083316, the content of this reference herewith being included in the present application.

It is also possible to use surface-reacted precipitated calcium carbonate, which preferably is produced according to a process described in EP application No. 2 070 991, namely by contacting a PCC-comprising pigment with $H_3O^+$ ions and with at least one anion being capable of forming water-insoluble calcium salts, said anion being solubilised in an aqueous medium to form a slurry of surface-reacted PCC-comprising pigment, wherein said surface-reacted PCC comprises an insoluble, at least partially crystalline calcium salt of said anion formed on the surface of at least part of the PCC, and an excess of solubilised calcium ions is provided.

In a preferred embodiment, the mineral material has a specific surface area of from 1 $m^2/g$ to 200 $m^2/g$, more preferably 20 $m^2/g$ to 120 $m^2/g$ and even more preferably 30 $m^2/g$ to 115 $m^2/g$, especially preferably 46 $m^2/g$ to 100 $m^2/g$, most preferably 50 $m^2/g$ to 80 $m^2/g$, e.g. 55 $m^2/g$ measured using nitrogen and the BET method according to ISO 9277.

Furthermore, it is preferred that the mineral material has a median particle size ($d_{50}$) of from 0.01 to 50 µm, more preferably from 0.05 to 25 µm, even more preferably 0.1 to 10 µm, especially preferably from 0.2 to 5 µm, e.g. 2.7 µm, particularly from 0.5 to 1.5 µm, e.g. 0.8 µm measured according to the method mentioned below.

For particles having a $d_{50}$ greater than 0.5 µm, the weight median particle size $d_{50}$ was determined using a Sedigraph 5100 device from the company Micromeritics, USA. The measurement was performed in an aqueous solution of 0.1 wt-% $Na_4P_2O_7$. The samples were dispersed using a high-speed stirrer and ultrasound. For particles having a $d_{50} \leq 500$ nm, the volume median particle size was determined using a Malvern Zetasizer Nano ZS from the company Malvern, UK. The measurement was performed in an aqueous solution of 0.1 wt % $Na_4P_2O_7$. The samples were dispersed using a high-speed stirrer and ultrasound.

In a preferred embodiment, the mineral material is a surface-reacted natural calcium carbonate having a specific surface area within the range of 15 to 200 m²/g and a weight median particle size within the range of 0.1 to 50 μm. More preferably, the specific surface area is within the range of 20 to 80 m²/g and the weight median particle size is within the range of 0.5 to 25 μm. Even more preferably, the specific surface area is within the range of 30 to 60 m²/g and the weight median particle size is within the range of 0.7 to 7 μm.

The mineral material can be provided in the form of a powder, although it is preferably applied in the form of a suspension, such as an aqueous suspension. In this case, the mineral material solids content of the suspension preferably is from 10 to 80 wt %, more preferably is from 20 to 75 wt %, even more preferably is from 30 to 60 wt %, most preferably is from 40 to 55 wt %, e.g. 50 wt %.

It is possible to combine the mineral material with binders such as e.g. styrene acrylate latex binders, such as Acronal S360D (BASF, Ludwigshafen, Germany) in order to improve the binding of the mineral material pre-coat on the substrate.

Further binders, which can be advantageously used in combination with the mineral material are e.g. selected from the group comprising starch, proteins, styrene butadiene latex, polyvinyl alcohol, polyvinyl acetate, and mixtures thereof.

The binders may be used in an amount of from 1 to 30 wt %, preferably 4 to 20 wt %, more preferably 5 to 15 wt %, most preferably 7 to 10 wt % based on the weight of the dry mineral material.

The polysaccharide material used in the present invention comprises one or more polysaccharides, which are preferably selected from the group comprising linear and branched polysaccharides such as cellulose, starch, chitin, chitosan, pectin, xanthan gum and dextran, and derivatives thereof.

Polysaccharide materials comprising one or more polysaccharides according to the present invention may be used in the dry state or in the form of suspensions, solutions, dispersions or emulsions, or as gels, especially nanogels, wherein the liquid medium may be water or organic solvents.

They preferably have a solids content of from 0.01 wt % to 50 wt %, preferably from 1 to 15 wt %, more preferably from 3 to 12 wt %, most preferably from 4 to 10 wt %. Generally the solids content may be as high as up to the saturation concentration depending on the viscosity of the polysaccharide.

Especially preferred are nanogels, i.e. the polysaccharide particles comprised in the gel have a diameter in the nanometer range, i.e. below or equal to 1 μm, e.g. from 1 to 200 nm, preferably from 10 to 100 nm, more preferably from 15 to 80 nm, even more preferably from 20 to 50 nm, most preferably from 25 to 40 nm, e.g. 30 nm.

It has turned out that the combination of such polysaccharide material, especially nano-gels, as a topcoat application onto a pre-coat of absorptive mineral material has a number of positive effects. For example, the holdout of such layers on the substrates is considerably increased, and the substrates are provided with a smoother surface as well as a higher bending stiffness compared with uncoated substrates, or substrates coated directly with such polysaccharide material without a mineral material pre-coat.

Even materials, such as starch, which are well-known and commonly used as a strengthening agent, e.g. in papermaking, either applied directly in the wet end or as a sizing agent on the substrate surface, may be used much more effectively by the combination with the absorptive mineral material pre-coat, e.g. in terms of stiffening of the sheet, which is not generally related to internal or surface strength per se, which is the main property normally imparted by starch, which is due to the fact that the polysaccharide material is at least partially absorbed into the mineral material pre-coat layer.

In this respect, starches, which may be used in accordance with the present invention, may be any one commonly known in coating applications, such as corn starch, tapioca, wheat and potato starch in their native or chemically or thermally modified form, as well as cationic starches. Examples for starches which are useful in the present invention are modified starches such as those available from Cerestar Cargill (Krefeld, Germany) under the tradenames C Film TCF 07302, C Film TCF 07311, C Film TCF 07312, C Film TCF 07324, as well as cationic starches such as C Film HS 05978, any one of which may be transformed into colloidal starch solutions, which are especially useful in the present invention, by dispersion of the starch powder in water at a certain solids of e.g. up to 45 wt % and heating the dispersion, as it is known by the person skilled in the art. According to the present invention, starches may also generally be used in the form of solutions and dispersions.

The above mentioned effect of combining the polysaccharide material with a mineral material pre-coat, can be even increased by the use of nano-fibrillar cellulose gels forming an in-situ surface nanocomposite. This increase is due to the nanofibrillar structural enhancing properties in terms of developing longer range strength integrity compared to soluble bonding agents.

Thus, in an especially preferred embodiment the polysaccharide material is a nano-fibrillar cellulose gel.

Cellulose is the structural component of the primary cell wall of green plants and is the most common organic compound on Earth. It is of high interest in many applications and industries.

Cellulose pulp as a raw material is processed out of wood or stems of plants such as hemp, linen and manila. Pulp fibres are built up mainly by cellulose and other organic components (hemicellulose and lignin). The cellulose macromolecules (composed of 1-4 glycosidic linked β-D-Glucose molecules) are linked together by hydrogen bonds to form a so called primary fibril (micelle) which has crystalline and amorphous domains. Several primary fibrils (around 55) form a so called microfibril. Around 250 of these microfibrils form a fibril.

The fibrils are arranged in different layers (which can contain lignin and/or hemicellulose) to form a fibre. The individual fibres are bound together by lignin as well.

When fibres become refined or applied energy they become fibrillated as the cell walls are broken and torn into attached strips, i.e. into fibrils. If this breakage is continued to separate the fibrils from the body of the fibre, it releases the fibrils. The breakdown of fibres into microfibrils is referred to as "microfibrillation". This process may be continued until there are no fibres left and only fibrils of nano size (thickness) remain.

If the process goes further and breaks these fibrils down into smaller and smaller fibrils, they eventually become cellulose fragments or nano-fibrillar gels. Depending on how far this last step is taken some nano-fibrils may remain amongst the nano-fibrillar gels. The breakdown to primary fibrils may be referred to as "nano-fibrillation", where there may be a smooth transition between the two regimes. The primary fibrils form in an aqueous environment a gel (meta stable network of primary fibrils) which may be referred to as "nano-fibrillar gel". The gel formed from the nano-fibrils can be considered to contain nanocellulose.

Thus, nano-fibrillar cellulose in the context of the present invention means fibres, which are at least partially broken down to primary fibrils, and nano-fibrillar gel means a gel, which is formed from these primary fibrils in an aqueous environment (meta stable network of primary fibrils considered in the limit of fineness to be essentially nanocellulose), wherein there is a smooth transition between nano fibres and nano-fibrillar gel, comprising nano-fibrillar gels containing a varying extent of nano-fibrils, all of which are comprised by the term nano-fibrillar cellulose gels according to the present invention.

Nano-fibrillar gels are desirable as they usually contain very fine fibrils, considered to be constituted in part of nanocellulose, showing a stronger binding potential to themselves, or to any other material present, than do fibrils which are not so fine or do not exhibit nanocellulosic structure.

Such nano-fibrillar gels are commercially available. e.g. under the tradename AVOCEL® MF 40-10 (J. Rettenmaier & Söhne GmbH & Co KG, Rosenberg, Germany).

Generally, nano-fibrillar gels useful in the present invention may be produced by fibrillation. In this respect, fibrillation means any process which predominantly breaks down the fibres and fibrils along their long axis resulting in the decrease of the diameter of the fibres and fibrils, respectively.

The size of the cellulose fibres before fibrillation in principle is not critical. Useful generally are any fibres commercially available and processable in the device used for their fibrillation. Depending on their origin, cellulose fibres may have a length of from 50 mm to 0.1 µm. Such fibres, as well as such having a length of preferably 20 mm to 0.5 µm, more preferably from 10 mm to 1 mm, and typically from 2 to 5 mm, can be advantageously used, wherein also longer and shorter fibres may be useful.

It is advantageous that the cellulose fibres are provided in the form of a suspension, especially an aqueous suspension. Preferably, such suspensions have a solids content of from 0.2 to 35 wt %, more preferably 0.25 to 10 wt %, even more preferably 0.5 to 5 wt %, especially 1 to 4 wt %, most preferably 1.3 to 3 wt %, e.g. 1.5 wt %.

Cellulose fibres, which can be used in the production of such gels may be such contained in natural, chemical, mechanical, chemimechanical, thermomechanical pulps. Especially useful are pulps selected from the group comprising eucalyptus pulp, spruce pulp, pine pulp, beech pulp, hemp pulp, cotton pulp, bamboo pulp, bagasse and mixtures thereof. In one embodiment, all or part of this cellulose fibre may be issued from a step of recycling a material comprising cellulose fibres. Thus, the pulp may also be recycled and/or deinked pulp.

In a special embodiment the cellulose fibres may be fibrillated in the presence of at least one filler and/or pigment providing a preferred nano-fibrillar cellulose gel. The fibrillation is performed until the gel is formed, wherein the formation of the gel is verified by the monitoring of the viscosity in dependence of the shearing rate. Upon step-wise increase of the shearing rate a certain curve reflecting a decrease of the viscosity is obtained. If, subsequently the shearing rate is step-wise reduced, the viscosity increases again, but the corresponding values over at least part of the shear rate range as shearing approaches zero are lower than when increasing the shearing rate, graphically expressed by a hysteresis manifest when the viscosity is plotted against the shearing rate. As soon as this behaviour is observed, a nano-fibrillar cellulose gel useful in the present invention is formed.

The at least one filler and/or pigment used in the fibrillation of cellulose fibres preferably is selected from the group comprising precipitated calcium carbonate (PCC); natural ground calcium carbonate (GCC); surface modified calcium carbonate; dolomite; talc; bentonite; clay; magnesite; satin white; sepiolite, huntite, diatomite; silicates; and mixtures thereof. Precipitated calcium carbonate, which may have vateritic, calcitic or aragonitic crystal structure, and/or natural ground calcium carbonate, which may be selected from marble, limestone and/or chalk, are especially preferred.

In a special embodiment, the use of ultrafine discrete prismatic, scalenohedral or rhombohedral precipitated calcium carbonate may be advantageous.

The filler(s) and/or pigment(s) can be provided in the form of a powder, although they are preferably added in the form of a suspension, such as an aqueous suspension. In this case, the solids content of the suspension is not critical as long as it is a pumpable liquid.

In a preferred embodiment, the filler and/or pigment particles used in the fibrillation of the cellulose fibres have a median particle size of from 0.01 to 15 µm, preferably 0.1 to 10 µm, more preferably 0.3 to 5 µm, especially from 0.5 to 4 µm and most preferably 0.7 to 3.2 µm, e.g. 2 µm, wherein, as mentioned above, for particles having a median particle size $d_{50}$ greater than 0.5. µm, the weight median particle size was determined using a Sedigraph 5100 device, and for particles having a median particle size $d_{50} \leq 500$ nm, the volume median particle size was determined using a Malvern Zetasizer Nano ZS.

During the fibrillation process, the size of the filler(s) and/or pigment(s) as well as the size of the fibres can change.

Thus, the fibrillated fibres, also called fibrils, which include aggregates of cellulose molecules, may have a diameter of from 1 to 200 nm, preferably from 10 to 100 nm, more preferably from 15 to 80 nm, even more preferably from 20 to 50 nm, most preferably from 25 to 40 nm, e.g. 30 nm determined as the volume median particle size using a Malvern Zetasizer Nano ZS.

The length of such fibrils, which can vary extremely depending on the pulp source and the production method, may be typically of from 1 to 5000 µm, preferably from 10 to 2000 µm, more preferably from 50 to 1000 µm, most preferably from 100 to 500 µm and was determined by SEM pictures, where the length was measured via comparison with the scale bar.

The combination of fibres and at least one filler and/or pigment can be carried out by adding the filler and/or pigment to the fibres in one or several steps. As well, the fibres can be added to the filler and/or pigment in one or several steps. The filler(s) and/or pigment(s) as well as the fibres can be added entirely or in portions before or during the fibrillating step. However, the addition before fibrillation is preferred.

Preferably, the weight ratio of fibres to filler(s) and/or pigment(s) on a dry weight basis is from 1:33 to 10:1, more preferably 1:10 to 7:1, even more preferably 1:5 to 5:1, typically 1:3 to 3:1, especially 1:2 to 2:1 and most preferably 1:1.5 to 1.5:1, e.g. 1:1.

The dosage of filler and/or pigment may be critical. If there is too much of the filler and/or pigment, this may influence the formation of the gel. Thus, if no gel formation is observed in specific combination, it might be necessary to reduce the amount of filler and/or pigment.

Furthermore, in one embodiment, the combination is stored for 2 to 12 hours, preferably 3 to 10 hours, more preferably 4 to 8 hours, e.g. 6 hours, prior to fibrillating it, as this ideally results in swelling of the fibres facilitating the fibrillation.

Fibre swelling may be facilitated by storage at increased pH, as well as by addition of cellulose solvents like, e.g. copper(II)ethylenediamine, iron-sodium-tartrate or lithium-chlorine/dimethylacetamine, or by any other method known in the art.

Fibrillation is carried out by means of any device useful therefor. Preferably the device is an homogenizer. It may also be an ultra fine friction grinder such as a Supermasscolloider from Masuko Sangyo Co. Ltd, Japan or one as described in U.S. Pat. Nos. 6,214,163 or 6,183,596.

Suitable for the fibrillation are any commercially available homogenizers, especially high pressure homogenizers, wherein the suspensions are pressed under high pressure through a restricted opening, which may comprise a valve, and are discharged from the restricted opening at high pressure against a hard impact surface directly in front of the restricted opening, thus reducing the particle size. The pressure may be generated by a pump such as a piston pump, and the impact surface may comprise an impact ring extending around the annular valve opening. An example for an homogenizer, which can be used in the present invention is Ariete NS2006L of GEA Niro Soavi. However, inter alia, also homogenizers such as of the APV Gaulin Series, HST HL Series or the Alfa Laval SHL Series can be used.

Furthermore, devices such as ultra-fine friction grinders, e.g. a Supermasscolloider, can be advantageously used in the present invention.

Further details with respect to the production of the nano-fibrillar cellulose gel in the presence of at least one filler and/or pigment can be taken from European patent application No. 2 236 545.

It is furthermore advantageous to combine such gels having being produced in the presence of fillers and/or pigments with further additional non-fibrillated fibres and/or at least one further filler and/or pigment after formation of the gel.

In this respect, the additional non-fibrillated fibres preferably are selected from cellulose fibres as defined above. However, also other fibre material may be advantageously used as additional non-fibrillated fibres in the process of the process of the present invention.

The at least one further filler and/or pigment may be selected from the group comprising precipitated calcium carbonate (PCC); natural ground calcium carbonate (GCC); surface modified calcium carbonate; dolomite; talc; bentonite; clay; magnesite; satin white; sepiolite, huntite, diatomite; silicates; and mixtures thereof. Precipitated calcium carbonate, which may have vateritic, calcitic or aragonitic crystal structure, and/or natural ground calcium carbonate, which may be selected from marble, limestone and/or chalk, are especially preferred.

In a special embodiment, the use of ultrafine discrete prismatic, scalenohedral or rhombohedral precipitated calcium carbonate may be advantageous.

Also these additional filler(s) and/or pigment(s) can be provided in the form of a powder, although they are preferably added in the form of a suspension, such as an aqueous suspension. In this case, the solids content of the suspension is not critical as long as it is a pumpable liquid.

It has however turned out especially advantageous, if the at least one further filler and/or pigment is a rather fine product in terms of the particle size, and especially preferably comprises at least a fraction of particles having a median diameter $d_{50}$ in the nanometre range, contrary to the pigment(s) and/or filler(s) used in the gel formation, which are rather coarse ones.

Thus, it is furthermore preferred that the at least one further filler and/or pigment particles have a median particle size of from 0.01 to 5 µm, preferably 0.05 to 1.5 µm, more preferably 0.1 to 0.8 µm and most preferably 0.2 to 0.5 µm, e.g. 0.3 µm, wherein, as mentioned above, for particles having a median particle size $d_{50}$ greater than 0.5. µm, the weight median particle size was determined using a Sedigraph 5100 device, and for particles having a median particle size $d_{50} \leq 500$ nm, the volume median particle size was determined using a Malvern Zetasizer Nano ZS.

Further details with respect to nano-fibrillar cellulose gel combined with additional unfibrillated fibres and/or further fillers and/or pigments after the formation of such gel can be taken from unpublished European patent applications No. 10 161 166.3 and 10 161 173.9.

The mineral material as well as any one of the fillers and/or pigments used in the nano-fibrillar cellulose gels may be associated with dispersing agents such as those selected from the group comprising homopolymers or copolymers of polycarboxylic acids and/or their salts or derivatives such as esters based on, e.g., acrylic acid, methacrylic acid, maleic acid, fumaric acid, itaconic acid, e.g. acryl amide or acrylic esters such as methylmethacrylate, or mixtures thereof; alkali polyphosphates, phosphonic-, citric- and tartaric acids and the salts or esters thereof; or mixtures thereof.

The mineral material as well as the polysaccharide material may be coated onto the substrate, or the mineral material pre-coat, respectively, by means of any well-known equipment for coating substrates, e.g. by bench coating, curtain coating, blade coating, knife coating and the like known in the art.

Especially preferred, especially on the lab scale, are bench coaters such as those available from Erichsen GmbH & Co. KG, Hemer, Germany, wherein different rods, such as different wire-wound rods may be used depending on the desired coat weights.

To achieve optimal coating coverage, it may be advantageous to load a large amount of the product in front of the rod before being drawn down. This ensures that there is enough of the product to be coated, and in the case of remaining product, such as fibres, if the nano-fibrillar gels are used, it can be drawn away with the rod.

This latter feature may also serve as a means of recycling the fibre retains fraction whilst delivering the soluble and nanofines fraction to the coating structure. Such a filtration process can be used to reduce manufacturing energy, if nanofibrillar cellulose gels are used by adopting the selective filtration and re-use of the fibre fraction for further cellulose gel production, thus avoiding further the viscosity rise in production and its associated energy loss, as well efficient processing if needed and hence providing a potential cost reduction in the overall nano- and microfibrillar cellulose production.

Thus, the application of the absorbent mineral material pre-coat can also be used to promote a filtration process to absorb the strengthening liquid phase from less well refined fibrillar cellulosic material.

Such a procedure can also give better efficiency in an onsite nano-fibrillar production process, and thus provides for a semi-continuous extraction of the important nanogel in an effective circuit process, by returning the excess microfibrous retains generated during the coating process.

The opportunities to save substrate material are clearly identifiable: for example in paper making refining costs can be reduced and/or higher filler loading applied, or more recycled fibre can be employed. The improved surface properties also enhance permeability control for both improved printability and for the production of cost-effective barrier layers.

If the coarser fraction is also applied as surface treatment, however, the application envisaged would require either a non-contact method, or a size press type application avoiding size exclusion in shear elements. Also, the use of air knife elements may be useful blowing excess coating away.

Non-cellulosic polysaccharide material such as e.g. polysaccharide material based on starch will not have these issues, and can be straightforwardly applied using a draw-down rod.

The mineral material as well as the polysaccharide material may be independently from each other coated onto the substrate and/or the mineral material pre-coat, respectively, in one or several layers.

The total coat weight of the mineral material pre-coat may be from 2 $gm^{-2}$ to 50 $gm^{-2}$, preferably from 5 $gm^{-2}$ to 40 $gm^{-2}$, more preferably from 7 $gm^{-2}$ to 30 $gm^{-2}$, most preferably from 8 $gm^{-2}$ to 25 $gm^{-2}$.

The total coat weight of polysaccharide material may be from 0.5 $gm^{-2}$ to 20 $gm^{-2}$, preferably from 1 $gm^{-2}$ to 15 $gm^{-2}$, more preferably from 2 $gm^{-2}$ to 11 $gm^{-2}$, most preferably from 3 $gm^{-2}$ to 5 $gm^{-2}$.

It is a further aspect of the present invention to provide a coated substrate obtained by the process described above in detail.

Thus, a further aspect of the present invention is a coated substrate comprising a mineral material pre-coat, and a coating comprising a polysaccharide material comprising one or more polysaccharides, wherein depending on the polysaccharide used, the polysaccharide material may be partially or completely absorbed by the mineral material pre-coat. It is also possible that a part of the polysaccharide material, such as e.g. cellulose fibres are covering the mineral material whereas the rest of the polysaccharide material is absorbed into the mineral material pre-coat.

In a preferred embodiment the coated substrate is a coated paper as defined above.

Another aspect of the present invention finally is the use of the coated substrates according to the invention as packaging material, composites, barrier layers, printing surfaces, strengthening aids and/or binders.

The figures described below, and the examples and experiments, serve to illustrate the present invention and should not restrict it in any way.

DESCRIPTION OF THE FIGURES

SEM images described below were obtained by fixing the sample of on a probe holder, coating this sample with gold in order to make it electrically conducting, subsequently putting the sample in the high-vacuum chamber of the SEM (Scanning electron microscope) apparatus (vacuum: approx. 2-3× $10^{-5}$ mbar, room temperature, voltage: 30 kV, working distance: 10 mm) and starting imaging. Where a previous sample preparation was carried out, it is indicated.

EXAMPLES

1. Materials

Substrate: Standard uncoated 80 $gm^{-2}$ woodfree copy paper (PlanoJet; Papyrus AB, Sweden).

Figure 1:
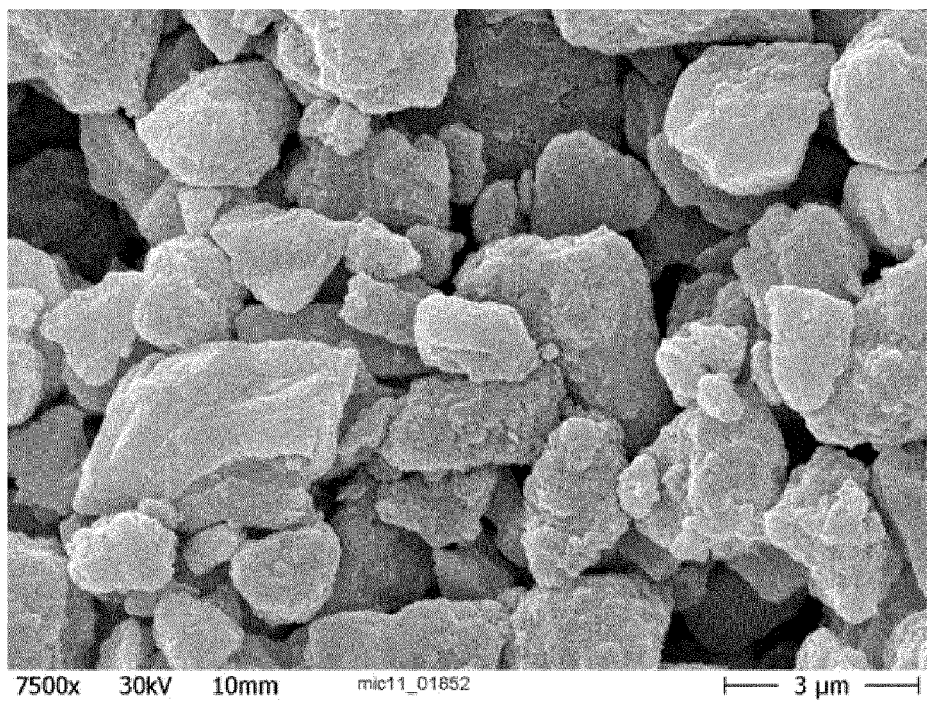
FIG. 1 shows a SEM image of surface-reacted natural ground calcium carbonate. The sample was prepared by spraying it with a sprayer on a filterpaper. Then, the filterpaper with the sample layer was dried at room temperature.

Mineral Material: Surface reacted natural ground calcium carbonate (Omyajet B6606; Omya AG, Oftringen, Switzerland; cf. FIG. 1); weight median particle diameter $d_{50}$=2.70 μm (Sedigraph 5100); specific surface area=56 $m^2$/g; in the form of an aqueous slurry having a solids content of 50 wt % with respect to the mineral material;

The mineral material was mixed with 10 wt % based on the amount of mineral material of a styrene acrylate latex binder (Acronal S360D; BASF, Ludwigshafen, Germany) and diluted to obtain a total solids content of 40 wt %.

Figure 2:
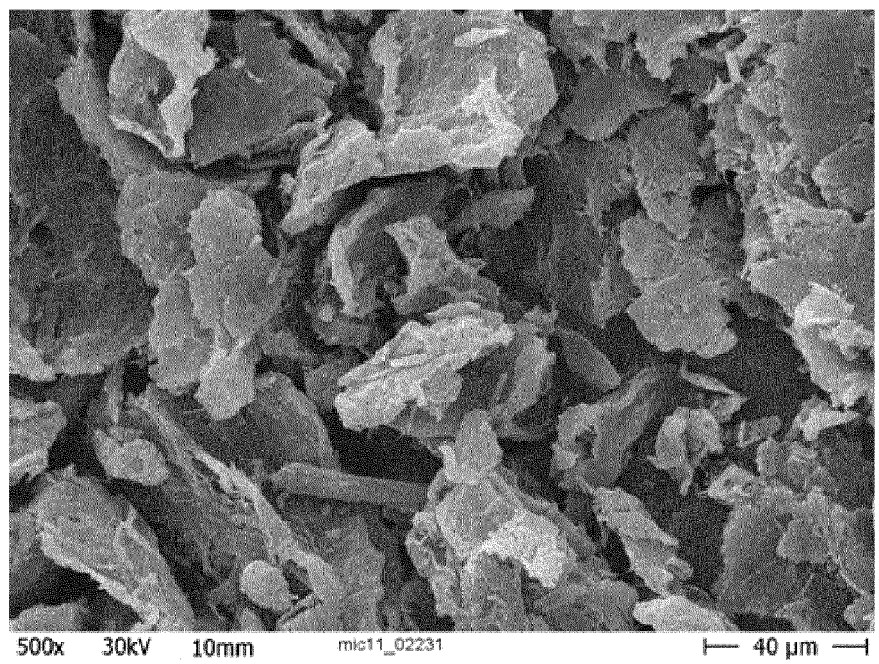
FIGS. 2 (*a*) and (*b*) show SEM images of commercial nanodisperse cellulose gel at different enlargements after freeze drying. The samples having a solids content of 10 wt % of the material in water, were shock frosted with liquid nitrogen, followed by freeze drying the shock frosted sample in vacuum (appr. 0.080 mbar, Temp. appr. −55° C.).
Figure 2:
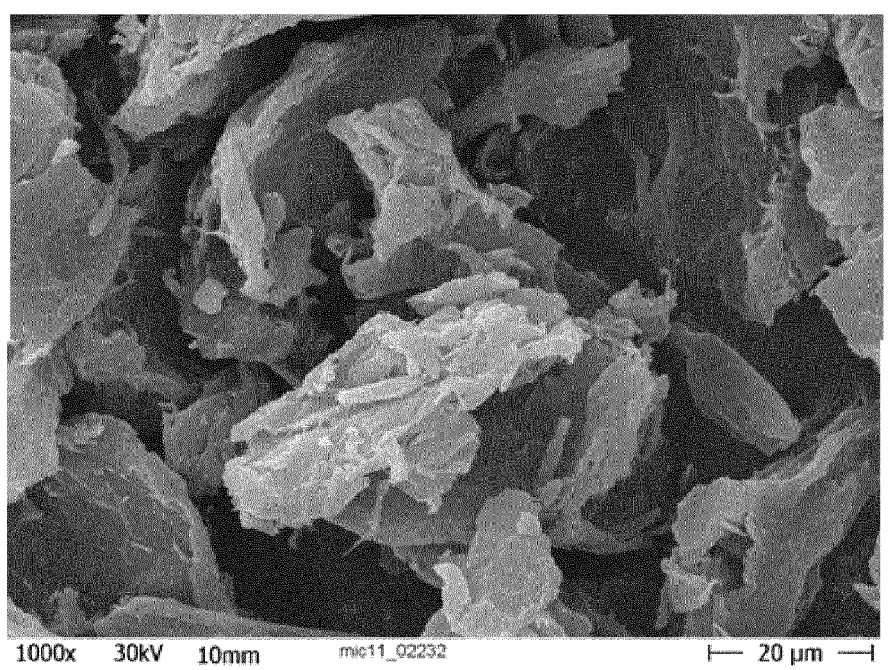

Polysaccharide Material:

PM 1: ARBOCEL MF 40-10 (J. Rettenmeyer and Söhne GmbH & Co. KG, Rosenberg, Germany), a nano disperse cellulose having a solids content of 10 wt %, a median particle (fibrous) diameter <1 μm, and a wet sieve residue at 25 μm<0.2 wt % (cf. FIG. 2).

Figure 3:
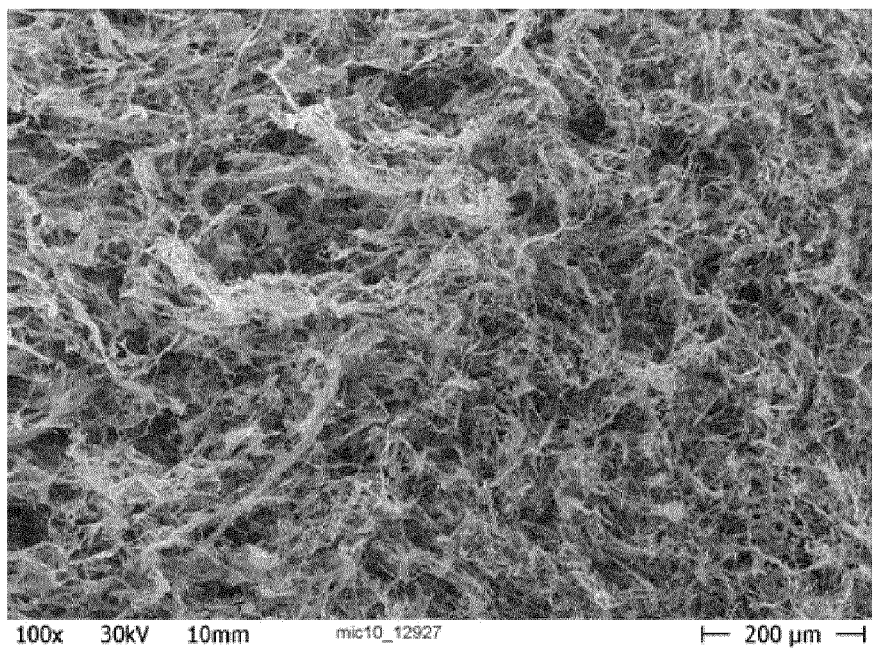
FIG. 3 shows SEM images of nanofibrillated cellulose gel formed in the presence of calcium carbonate (a) after freezedrying, (b) as a suspension sprayed on a filter paper and then dried. Sample (a) having a solids content of 0.5 wt % of the material in water was shock frosted with liquid nitrogen, followed by freeze drying the shock frosted sample in vacuum (appr. 0.080 mbar, Temp. appr. −55° C.). Sample (b) having a solids content of 0.5 wt % of the material in water was sprayed with a sprayer on filterpaper. The filterpaper with the sample layer was dried at room temperature.
Figure 3:
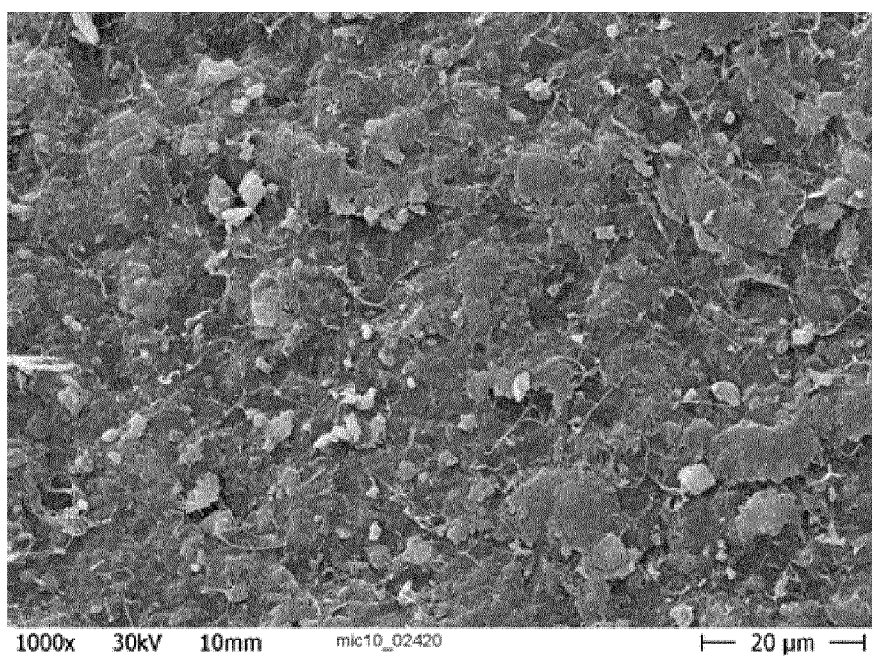
Figure 4:
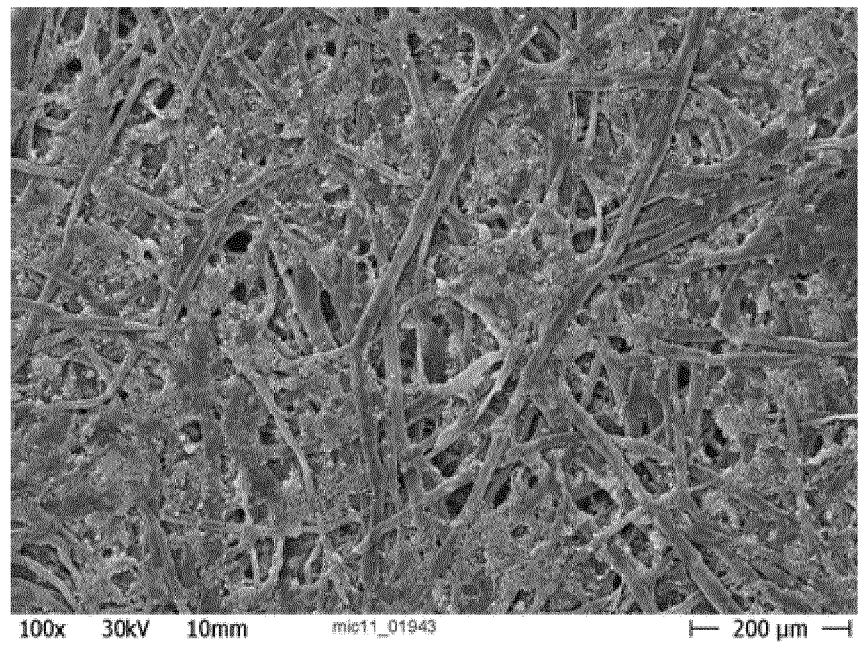
FIG. 4 shows the coat weights (uptake) of different polysaccharide materials on uncoated and mineral material substrates, respectively, as a function of metered applied volume.
Figure 4:
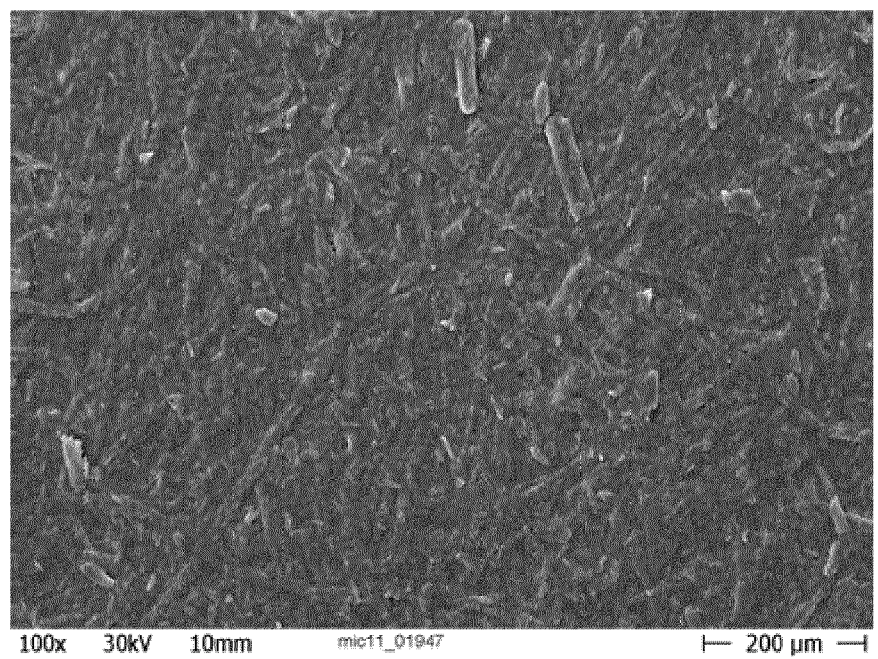

PM 2: Nano-fibrillar cellulose gel formed in the presence of calcium carbonate using a dissolver disc and then fibrillated using a Supermasscolloider (cf. FIG. 3).

180 g dry Eucalyptus pulp, 5820 g tap water and 18 g Omyacarb 1 AV (available from Omya AG; Fine calcium carbonate powder, manufactured from a high purity, white marble; The weight median particle size $d_{50}$ is 1.7 µm measured by Malvern Mastersizer X) (10:1 pulp to filler, dry/dry) were mixed using a Pendraulik stirrer at 2000 rpm with a mounted dissolver disk (d=70 mm) for at least 10 minutes. This mixture was processed with the Supermasscolloider as described below.

The above composition was processed with an ultra-fine friction grinder (Supermasscolloider from Masuko Sangyo Co. Ltd, Japan (Model MKCA 6-2) with mounted silicon carbide stones having a grit class of 46 (grit size 297-420 µm). The gap between the stones was adjusted to "−50" µm (dynamic 0-point, as described in the manual delivered by the supplier). The speed of the rotating grinder was set to 2500 rpm for passes 1-5, to 2000 rpm for passes 6 and 7, to 1500 rpm for passes 8 and 9, to 1000 rpm for passes 10 and 11, to 750 rpm for passes 12 and 13 and to 500 rpm for passes 14 and 15.

PM 3: Cationic starch solution (C-FILM 05978; Cargill International S.A, 1206 Geneva, Switzerland), made to 12 wt % solids concentration.

Comparative Examples

For comparative purposes, the above-mentioned polysaccharide materials were coated directly onto the substrate, i.e. without a pre-coat of mineral material using the equipment described below.

Inventive Examples

In order to illustrate the benefits of combining the polysaccharide material with a mineral material pre-coat according to the invention and thus causing the polysaccharides, especially the cellulose fibre material, not to pass through the surface, a discretely bimodal porous coating layer (i.e. having intraparticle pores and interparticle pores) consisting of the mineral material was first applied directly onto the base paper.

The mineral material coating formulation was applied to the base paper using a range of different wire-wound rods on a bench coater (Erichsen GmbH & Co. KG, Hemer, Germany) to achieve a range of different coat weights (cf. table below).

These sheets were then coated with the above described polysaccharide materials PM 1, PM 2 and PM 3, respectively, which were also each coated to three different coat weights.

2. Methods

The finest rod available for the bench coater was used as only a light coating was required.

Due to the high water content of the polysaccharide materials, a resulting waviness of the paper was an issue, especially if higher amounts were applied. This problem was addressed by keeping the paper as flat as possible during drying, and, in the case of higher application weights, between multiple application layers.

It was also found that to achieve the optimal coating coverage a large amount of the product should be loaded in front of the rod before being drawn down. This ensures there is enough of the fine fibrillar gel to be coated, and remaining fibres can be drawn away from the rod.

From the table below, the coat weights reached when using the different rods for the mineral material-latex pre-coats and also for the gel layers coated on either the base paper itself or on the mineral material-latex pre-coat can be taken.

| | Coat weight/gm$^{-2}$ applied directly on base paper | | | |
|---|---|---|---|---|
| | rod 1* | rod 2* | rod 3* | rod 4* |
| Mineral material pre-coat | 9.99 | 11.13 | 18.21 | 28.46 |
| | applied onto mineral material pre-coat rod 0* | | | |
| PM 1 × 1 (single coat) | 4.10 | 2.92 | 4.02 | 2.97 | 2.52 |
| PM 1 × 2 (double coat) | 8.31 | 7.49 | 5.17 | 5.50 | 4.16 |
| PM 1 × 3 (triple coat) | 11.14 | 11.93 | 6.26 | 8.89 | 6.06 |
| PM 2 × 1 (single coat) | 2.60 | 2.10 | 2.26 | 3.54 | 2.06 |
| PM 2 × 2 (double coat) | 3.34 | 2.96 | 2.21 | 3.92 | 2.26 |
| PM 2 × 3 (triple coat) | 3.96 | 2.92 | 2.44 | 5.60 | 4.19 |
| PM 3 × 1 (single coat) | 2.23 | 2.76 | 2.37 | 3.60 | 1.07 |
| PM 3 × 2 (double coat) | 5.39 | 4.14 | 4.45 | 5.33 | 4.65 |
| PM 3 × 3 (triple coat) | 7.57 | 5.59 | 6.62 | 6.85 | 5.36 |

*rod 0 (white): wet film thickness: 4 µm
rod 1 (yellow): wet film thickness: 6 µm
rod 2 (red): wet film thickness: 12 µm
rod 3 (green): wet film thickness: 24 µm
rod 4 (black): wet film thickness: 40 µm For each pre-coated substrate there is generally a decrease in uptake of polysaccharide material as the coat weight of the pre-coating layers applied increases. This is a clear indication that the uptake of polysaccharide material on an uncoated paper is defined by the porosity of the paper fibre matrix, i.e. the holdout on uncoated paper is very poor, and only when a pigmented coating layer is applied does the capture of the polysaccharide material at the surface improve the holdout. The uptake of the material is therefore related to the permeation roughness or, when coated, inversely to the coating coverage.

The papers were subsequently calendered at 90° C. at a load of 40 bar adopting 4 passes through a single nip using a Voith calander—HB THERM Series 3.

3. Characteristics 3.1. Holdout

The holdout was essentially visually evaluated by means of SEM images using a LEO 435 VPi SEM secondary electron detector.

For this purpose, the samples were mounted with tape on a standard aluminium sample holder and pre-coated with 50 nm of gold.

Figure 5:
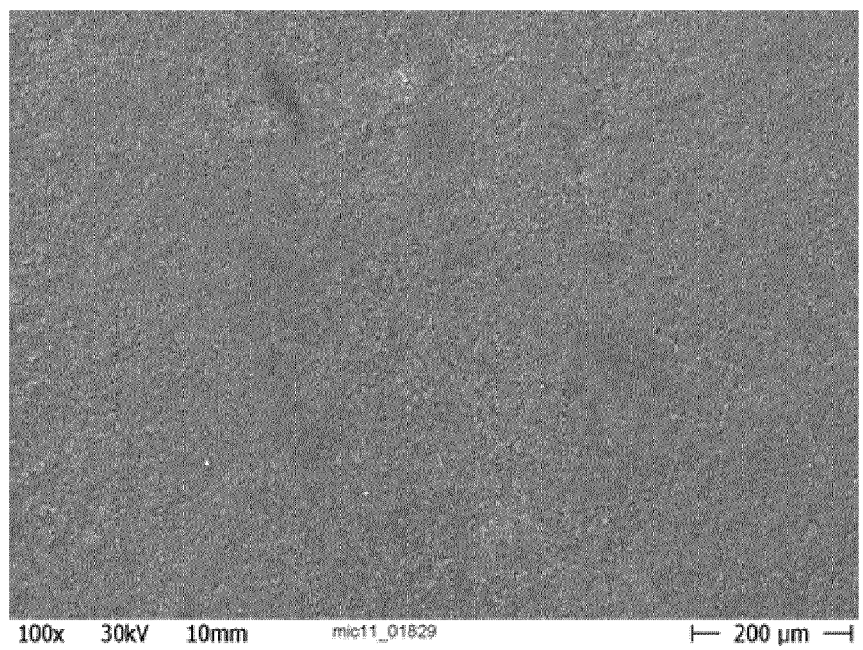
FIG. 5 shows SEM images of an uncalendered base paper alone (FIG. 5*a*) and coated with a commercial cellulose gel (applied three times) (FIG. 5*b*).
Figure 5:
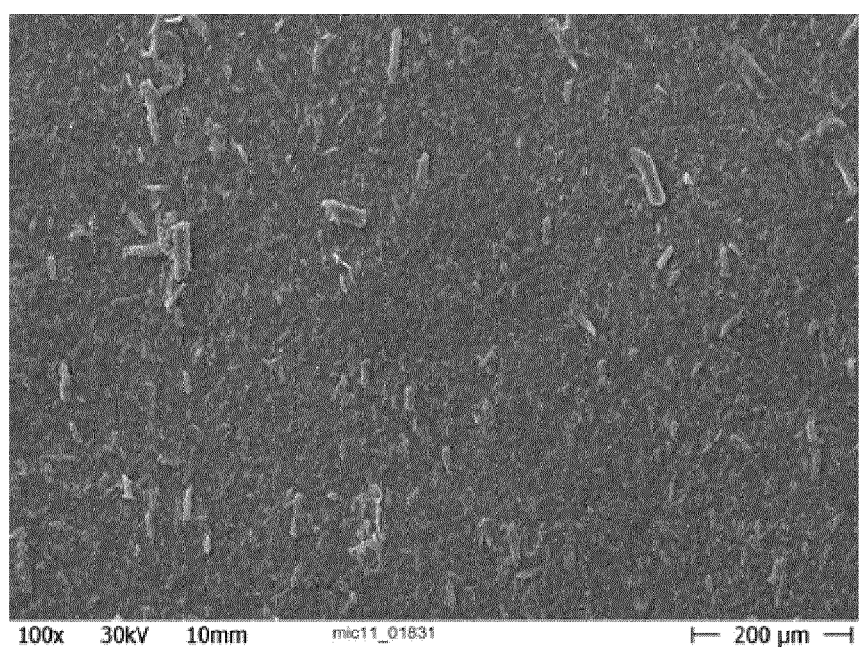

FIG. 5 shows SEM images of an uncalendered base paper alone (FIG. 5a) and coated with PM 1, i.e. the commercial cellulose gel (applied three times), without a mineral material pre-coat (FIG. 5b).

As can be taken from FIG. 5b, although there is relatively good coverage by PM 1 (×3), there is still the clear underlying fibre definition and some penetration into the sheet by the gel.

Figure 6:
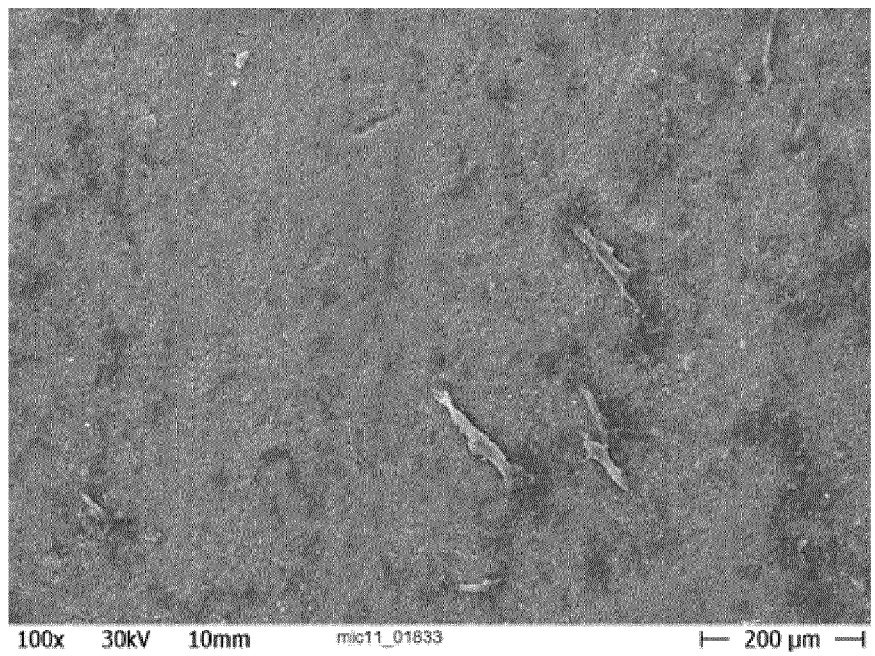
FIG. 6 shows SEM images of an uncalendered base paper coated with a mineral material only (FIG. 6*a*) and coated with a triple layer of a commercial cellulose gel on top of the mineral material layer (FIG. 6*b*).
Figure 6:
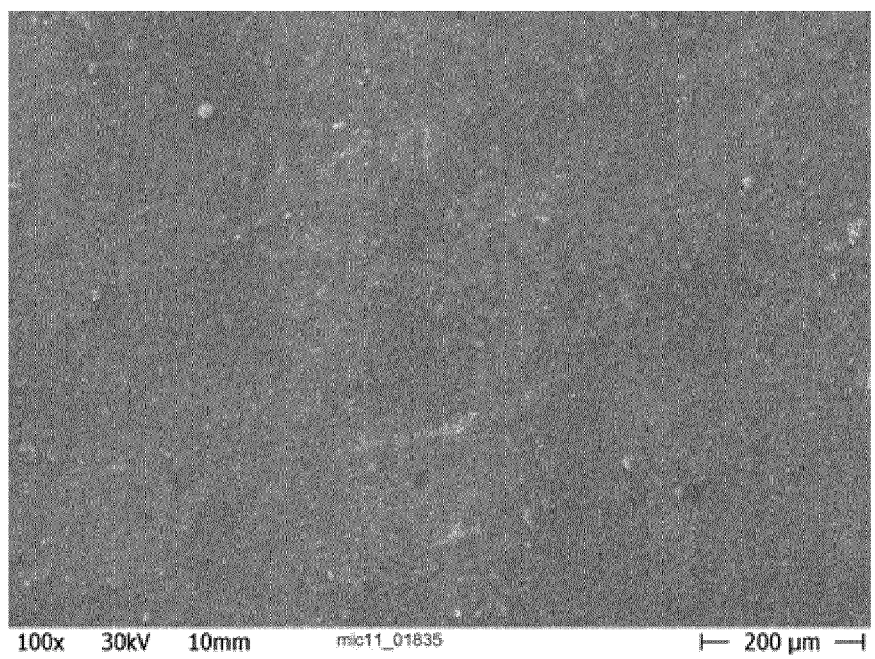

As can be taken from FIG. 6 showing SEM images of an uncalendered base paper coated with the mineral material (rod 4) only (FIG. 6a) and coated with a triple layer of PM 1 on top of the mineral material layer (rod 4) (FIG. 6b), base paper fibres can no longer be identified, though cellulose fibril residues are clearly seen.

Once the base paper is coated with the mineral material, it is no longer possible to see the individual base paper fibres and coating this with PM 1 shows complete holdout.

This clearly shows that the mineral material pre-coat provides for improved coverage with the cellulose gel.

Figure 7:
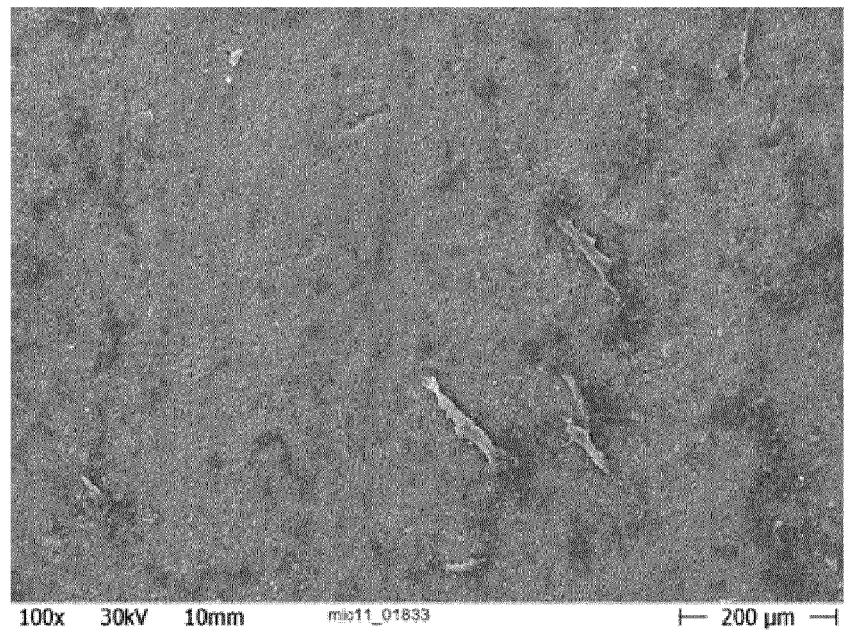
FIG. 7 shows SEM images of base paper pre-coated with mineral material and subsequently coated with a nanofibrillated cellulose gel formed in the presence of calcium carbonate (FIG. 7*a*) and a starch material (FIG. 7*b*).
Figure 7:
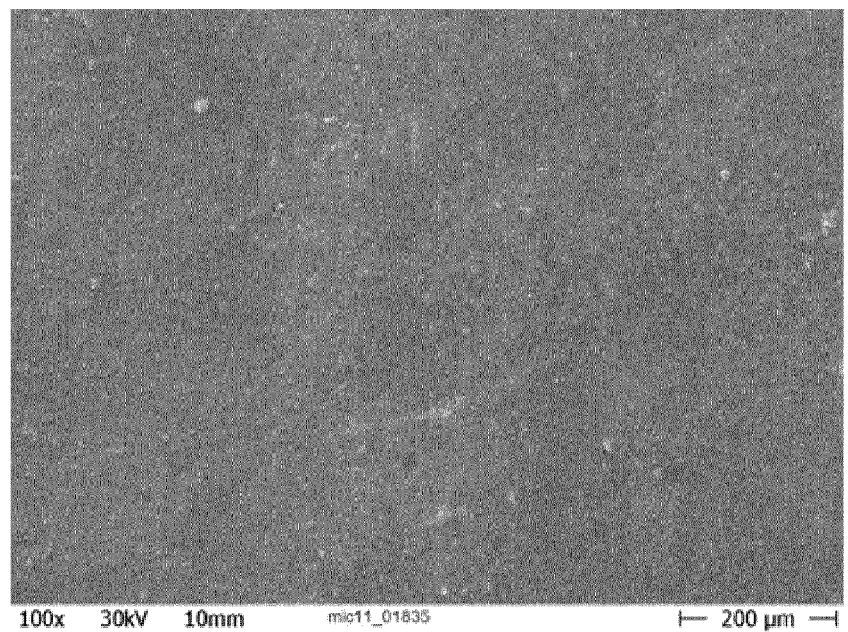

The samples pre-coated with the mineral material layer (rod 4) and subsequently coated with PM 2 (×3) show some light and dark patches in the SEM image (FIG. 7a). The samples subsequently coated with PM 3 (×3) show a comparable result, but a more even coating (FIG. 7b).

Figure 8:
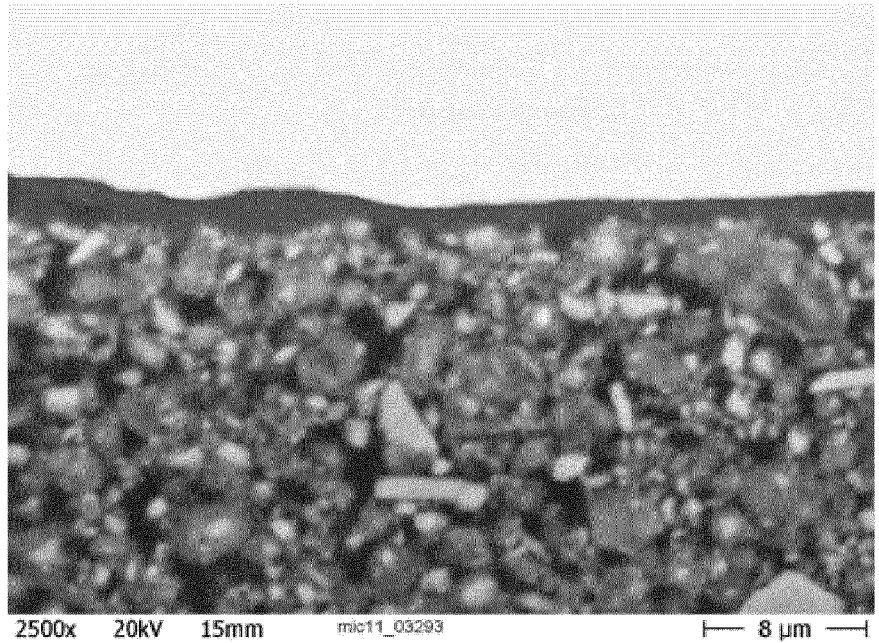
FIG. 8 is a cross sectional SEM image of fibre hold out of a commercial cellulose gel on absorptive mineral material pre-coat layer on an uncalendered base paper.

Furthermore, cross sectional images were made (cf. FIG. 8), which showed that part of the fibrillar portion of PM 1 (3×) is held out on top of the pre-coat layer (rod 4). The larger fraction of the fibres are held on the surface while the nanogel components will have filtered through and be held within the coating structure of the mineral material, thus forming a layered composite providing especially good strength according to the I-beam principle.

Figure 9:
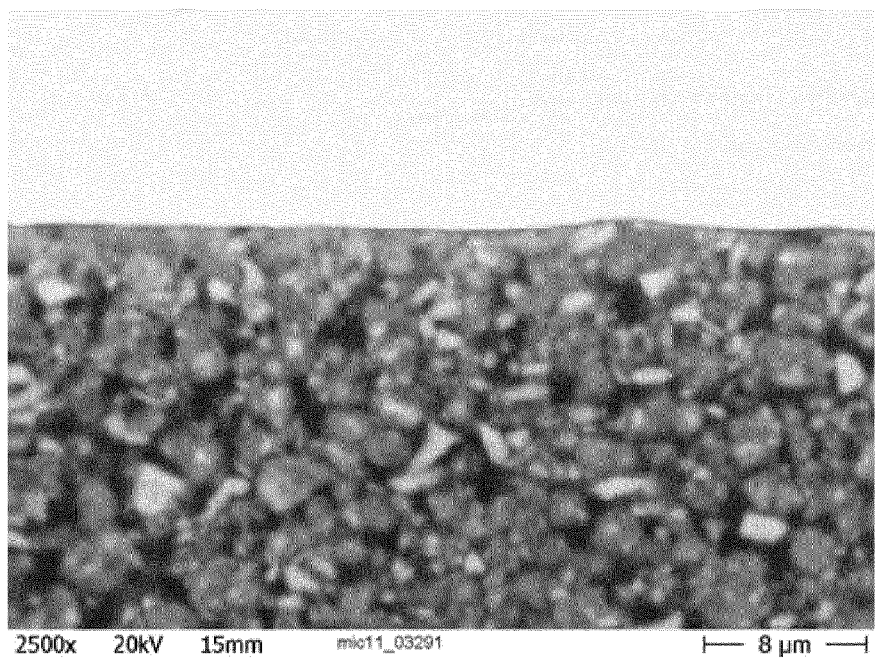
FIG. 9 is a cross sectional SEM image of a starch material absorbed into the surface of the mineral material pre-coat layer on an uncalendered base paper.

As can be taken from FIG. 9, PM 3 (3×) on the other hand is absorbed directly into the absorptive layer, thus forming an in-situ nanocomposite, as well.

3.2. Roughness

Roughness of the coated surfaces was determined by surface profilometry by means of confocal laser scanning microscopy (CLSM or LSCM) using a Zeiss LSM 5 PASCAL, which is a technique for acquiring high-resolution in-focus optical images at different depths. These depths at defined measured positions can be converted into a roughness value. CLSM analysis enables a comparison of the surface roughness of the samples to be made.

Figure 10:
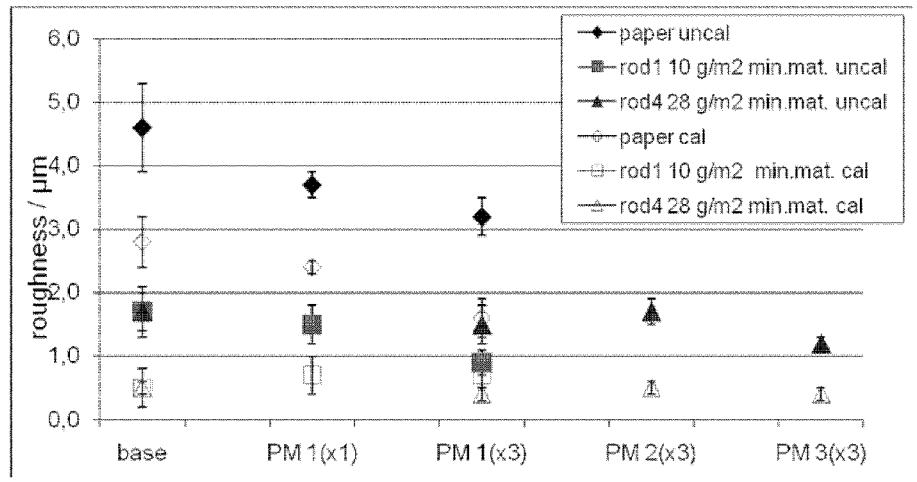
FIG. 10 is an illustration of the roughness values of selected coated samples.

The CLSM roughness values are shown in FIG. 10. Each point is an average of 10 3D measurements calculated from the formula (the depth profile is measured at 10 different places on the sheet, then the average of these 10 points is calculated):

$$R_q = \sqrt{\frac{1}{N_x N_y} \sum_{i=1}^{N_x} \sum_{j=1}^{N_y} [z(x_i, y_j) - \langle z \rangle]^2}$$

where Rq is the root mean square deviation. The double summation over Nx and Ny describes the number of pixels in the x- or y-direction, z is the surface height value and $\langle z \rangle$ is the mean surface height value.

It can be taken from FIG. 10 that the base paper samples have the roughest surfaces, that calendering gives a smoothing effect, wherein the values for the mineral material pre-coat applications are all seen to the left of FIG. 10, above the label "base". Coating the base with mineral material gives a lower roughness value, and, again, calendering lowers this value significantly.

Coating with one layer of PM 1 reduces the roughness when coated on the paper itself as well as on the lighter mineral material pre-coat layer. Applying three layers of PM 1 (PM 1×3) has a greater effect, but here also we see the greater effect of a heavier mineral material pre-coat (triangular points).

3.3. Bending Stiffness

The samples were measured for bending stiffness using the beam method (Lorentzen & Wettre Bending Tester) on both uncalendered and calendered samples. Eight samples per sheet were measured. These were cut in the machine direction and were measured four from the top side and four from the back side. The average of these eight measurements is reported.

Figure 11:
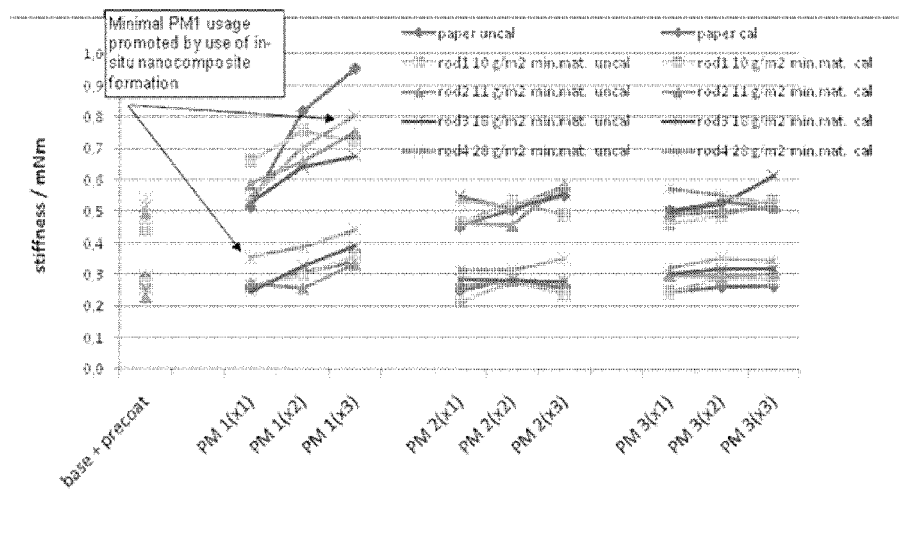
FIG. 11 is an illustration of the bending stiffness of uncalendered and calendered papers pre-coated with increasing amounts of mineral material and coated with increasing amounts of commercial cellulose gel, cellulose gel comprising filler and starch material.
Figure 12A:
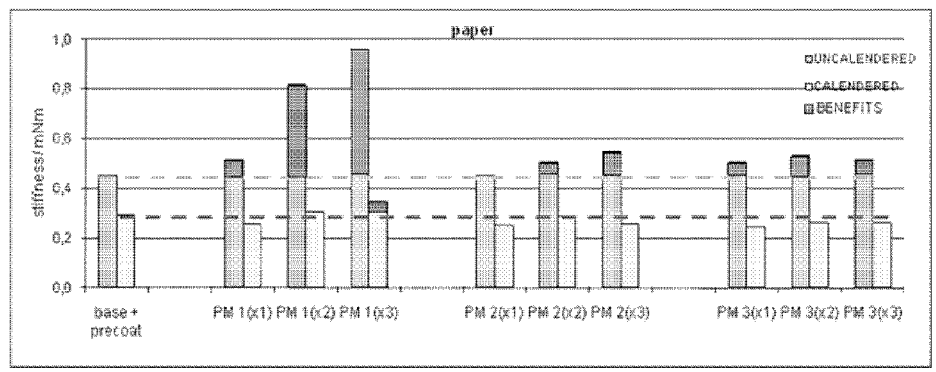
FIGS. 12 *a*) to *e*) are more detailed illustrations of the bending stiffness of uncalendered and calendered papers precoated with increasing amounts of mineral material and coated with increasing amounts of commercial cellulose gel, cellulose gel comprising filler and starch material showing the benefits of the present invention.
Figure 12B:
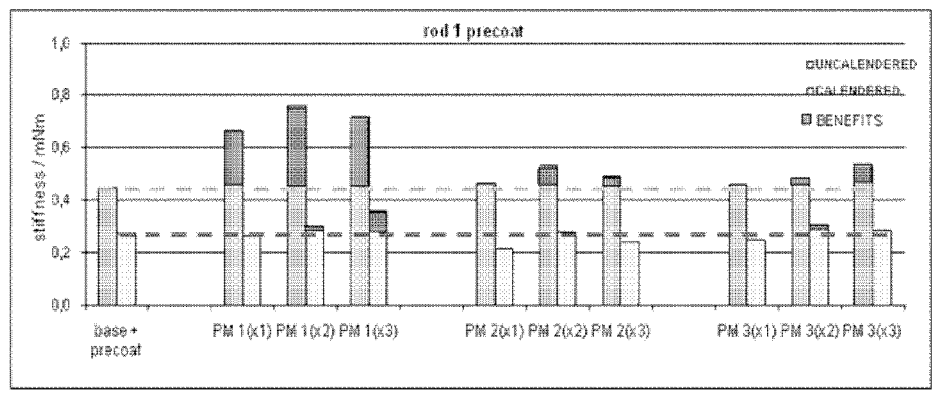
Figure 12C:
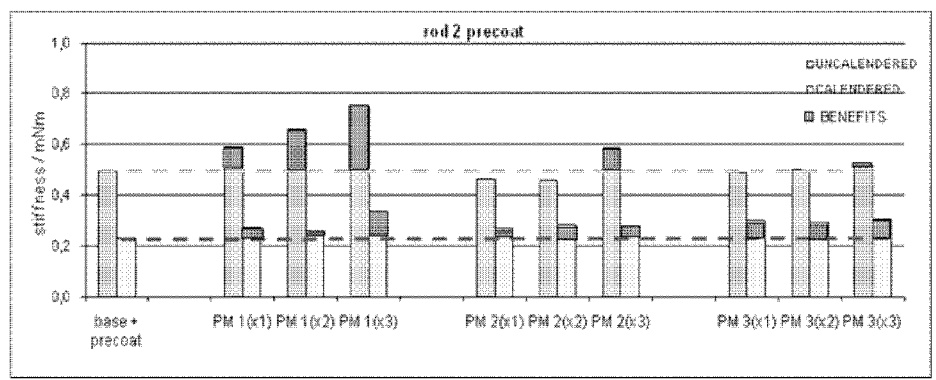
Figure 12D:
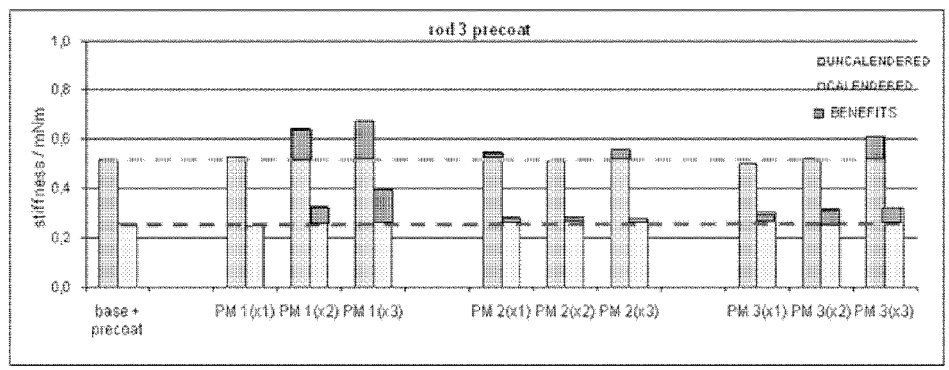
Figure 12E:
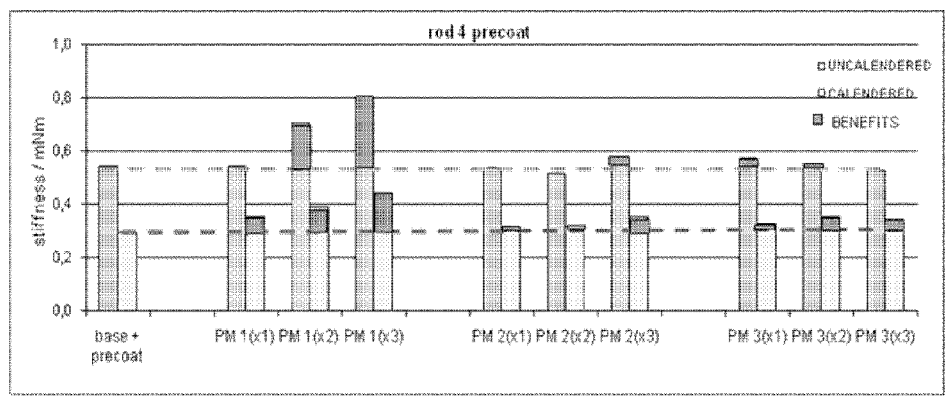

The bending stiffness of the samples of uncalendered and calendered papers pre-coated with increasing amounts of mineral material and coated with increasing amounts of PM 1, PM 2 and PM 3 was measured, the results of which are shown in FIG. 11.

The bending stiffness values trend with the coating weights measured for the samples. The values also decrease with calendering, as would be expected. For the greatest improvement in stiffness, a higher pre-coat weight was needed. This supports the need for improved holdout of the stiffening agent.

FIGS. 12 a) to e) very clearly show the benefits of the present invention. The dashed lines form a reference in relation to the substrate indicating the benefits of applying polysaccharide material pre-coats. Paper and pre-coat rod 1 show most benefit for the uncalendered samples. Pre-coat rod 2 and rod 3 show most benefit for the calendered samples.

3.4. Permeability

A stack of paper samples (approximately 70 cut to 1.5×1.5 cm² sheets) is placed under a slight overpressure, applied by a suitable light weight to ensure the sheets are lying flat, into a PTFE mould having an inner diameter of 30 mm (available from Prüfmaschinen AG, Dietikon, Switzerland) and used to form the cylindrical embedments. Subsequently, resin (Technovit 4000; Heraeus Kulzer GmbH, Wehrheim/Ts, Germany) is poured around it in order to embed the paper.

The quickly rising viscosity of the chosen curing resin results in a penetration of approximately 1 mm locally at the outer boundaries of the sample. This penetration depth is clearly visible because of the opacity change at the edge of the sample and can, therefore, be calibrated. The open area of the porous sample, i.e. that free from resin, is evaluated so that the permeable cross-sectional area can be established. The sample discs are placed in a dish containing the probe liquid in order to saturate the void network of the sample before placing in the apparatus. Hexadecane is used in the experiments with density, $\rho=773$ kgm$^{-3}$ and viscosity, $\eta=0.0034$ kgm$^{-1}$s$^{-1}$. The sample disc is then placed in a specially constructed pressure cell. The use of the resin to embed the samples allows for rigid clamping and sealing of the sample into the pressure cell chamber. Gas over-pressure is supplied from a nitrogen bottle. The pressure cell is fixed over a microbalance and a PC samples the continuous flow on the balance data using specially-developed software (obtainable from Dr. C. J. Ridgway, Omya Development AG, CH 4665 Oftringen, Switzerland). Details of this measurement technique can be found in Ridgway et al. [Ridgway et al., 2003].

The continuous flow can be expressed in terms of the Darcy permeability constant, k, as $$\frac{dV(t)}{dt} = \frac{-kA\Delta P}{\eta l}$$

where dV(t)/dt is defined as the flux or volume flow rate per unit cross-sectional area, A, $\Delta P$ is the applied pressure difference across the sample, $\eta$ is the viscosity of the liquid and l is the length of the sample, in this case calculated as the number of sheets multiplied by the sheet caliper.

Figure 13:
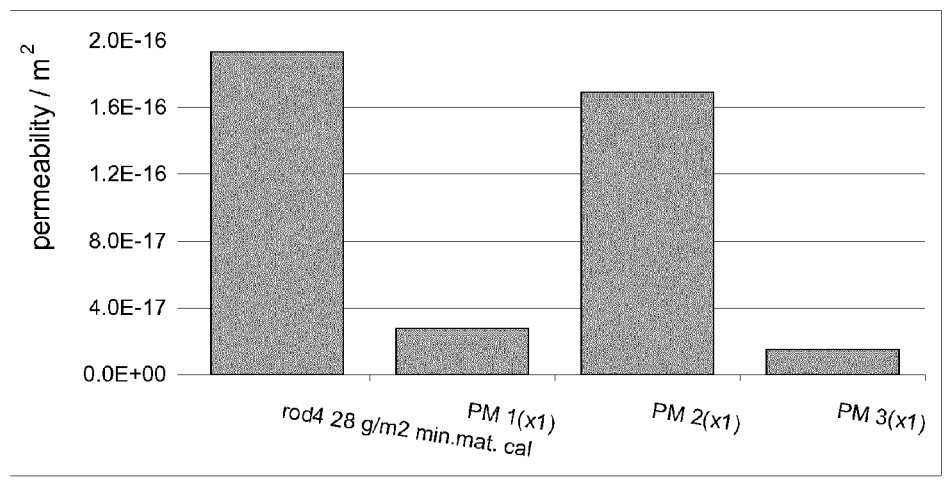
FIG. 13 is an illustration of the permeabiloity of uncalendered and calendered papers pre-coated with increasing amounts of mineral material and coated with increasing amounts of commercial cellulose gel, cellulose gel comprising filler and starch material.

The permeability of the calendered samples with the higher pre-coat weights and gels 1 to 3 coated once or three times have been measured. The results are shown in FIG. 13, and it can be seen that coating with PM 1 has reduced the permeability considerably by closing the surface of the absorbing pre-coat layer, forming a liquid (oil) barrier layer. Also PM 2 has reduced the permeability. The application of PM 3 gives an almost sealing effect to the pre-coated layer resulting in a very low permeability value.

The invention claimed is:

1. A process for manufacturing a coated substrate comprising the steps of:
   a) providing a substrate;
   b) providing at least one mineral material comprising calcium carbonate;
   c) providing a polysaccharide material comprising one or more polysaccharides;
   d) coating the substrate with the at least one mineral material to obtain a pre-coat layer containing from 2 gm$^{-2}$ to 50 gm$^{-2}$ of mineral material; and
   e) coating the pre-coat layer of mineral material with the polysaccharide material comprising one or more polysaccharides to obtain a coated substrate.

2. The process according to claim 1, wherein the substrate is a paper, a board, a calendered paper, an uncalendered paper, a coated paper, a coated board, an uncoated paper, an uncoated board, a synthetic paper, a non-woven product, a packaging material, a constructional material, a decorative paper, a paperboard or a surface finishing.

3. The process according to claim 1, wherein the mineral material is precipitated calcium carbonate (PCC), natural ground calcium carbonate (GCC), surface modified calcium carbonate, or any mixture thereof, or calcium carbonate in admixture with one or more of dolomite, talc, bentonite, clay, magnesite, satin white, sepiolite, huntite, diatomite, a silicate and titanium dioxide.

4. The process to claim 1, wherein the mineral material is a surface-modified calcium carbonate that is a reaction product of natural calcium carbonate with carbon dioxide and one or more acids, wherein the carbon dioxide is formed in situ by the acid treatment and/or is supplied from an external source.

5. The process according to claim 1, wherein the mineral material is a surface-modified calcium carbonate that is a reaction product of a PCC-comprising pigment with $H_3O^+$ ions and with at least one anion capable of forming water-insoluble calcium salts, wherein the anion is solubilized in an aqueous medium to form a slurry of surface-reacted PCC-comprising pigment, wherein the surface-reacted PCC comprises an insoluble, at least partially crystalline calcium salt of the anion formed on the surface of at least part of the PCC, and wherein an excess of solubilized calcium ions is provided.

6. The process according to claim 1, wherein the mineral material has a median particle size of from 0.01 to 50 µm.

7. The process according to claim 1, wherein the mineral material has a median particle size of from 0.05 to 25 µm.

8. The process according to claim 1, wherein the mineral material has a median particle size of from 0.1 to 10 µm.

9. The process according to claim 1, wherein the mineral material has a median particle size of from 0.2 to 5 µm.

10. The process according to claim 1, wherein the mineral material has a median particle size of from 0.5 to 1.5 µm.

11. The process according to claim 1, wherein the mineral material is provided in the form of an aqueous suspension having a solids content of from 10 to 80 wt %.

12. The process according to claim 1, wherein the mineral material is provided in the form of an aqueous suspension having a solids content of from 20 to 75 wt %.

13. The process according to claim 1, wherein the mineral material is provided in the form of an aqueous suspension having a solids content of from 30 to 60 wt %.

14. The process according to claim 1, wherein the mineral material is provided in the form of an aqueous suspension having a solids content of from 40 to 55 wt %.

15. The process according to claim 1, wherein the mineral material is provided in combination with a binder.

16. The process according to claim 15, wherein the binder is a styrene acrylate latex starch, a protein, a styrene butadiene latex, a polyvinyl alcohol, a polyvinyl acetate, or any mixture thereof.

17. The process according to claim 1, wherein the one or more polysaccharides in the polysaccharide material is a linear or branched polysaccharide, cellulose, starch, chitin, chitosan, pectin, xanthan gum, dextran, or derivative thereof.

18. The process according to claim 1, wherein the polysaccharide material comprising one or more polysaccharides in the dry state, or in the form of a suspension, solution, dispersion, emulsion, gel or nanogel.

19. The process according to claim 1, wherein the polysaccharide material comprising one or more polysaccharides is a nano-fibrillar cellulose gel.

20. The process according to claim 19, wherein the nano-fibrillar cellulose gel is produced by fibrillating cellulose fibres in the presence of at least one filler and/or pigment until a gel is formed.

21. The process according claim 20, wherein the cellulose fibres are obtained from eucalyptus pulp, spruce pulp, pine pulp, beech pulp, hemp pulp, cotton pulp, bamboo pulp, bagasse, recycled and/or deinked pulp, or any mixture thereof.

22. The process according to claim 20, wherein the at least one filler and/or pigment is precipitated calcium carbonate (PCC), natural ground calcium carbonate (GCC), surface modified calcium carbonate, dolomite, talc, bentonite, clay, magnesite, satin white, sepiolite, huntite, diatomite, a silicate; or any mixture thereof.

23. The process according to claim 20, wherein the at least one filler and/or pigment is precipitated calcium carbonate having vateritic, calcitic or aragonitic crystal structure; ultrafine discrete prismatic, scalenohedral or rhombohedral precipitated calcium carbonate; natural ground calcium carbonate obtained from marble, limestone and/or chalk; or any mixture thereof.

24. The process according to claim 23, wherein the at least one filler and/or pigment has a median particle size of from 0.01 to 15 µm.

25. The process according to claim 23, wherein the at least one filler and/or pigment has a median particle size of from 0.01 to 10 µm.

26. The process according to claim 23, wherein the at least one filler and/or pigment has a median particle size of from 0.3 to 5 µm.

27. The process according to claim 23, wherein the at least one filler and/or pigment has a median particle size of from 0.5 to 4 µm.

28. The process according to claim 23, wherein the at least one filler and/or pigment has a median particle size of from 0.7 to 3.2 µm.

29. The process according to claim 20, wherein the nano-fibrillar cellulose gel is combined with additional non-fibrillated fibres and/or at least one additional filler and/or pigment.

30. The process according to claim 20, wherein the nano-fibrillar cellulose gel is combined with at least one additional filler and/or pigment having a median particle size of from 0.01 to 5 µm.

31. The process according to claim 20, wherein the nano-fibrillar cellulose gel is combined with at least one additional filler and/or pigment having a median particle size of from 0.05 to 1.5 µm.

32. The process according to claim 20, wherein the nanofibrillar cellulose gel is combined with at least one additional filler and/or pigment having a median particle size of from 0.1 to 0.8 µm.

33. The process according to claim 20, wherein the nanofibrillar cellulose gel is combined with at least one additional filler and/or pigment having a median particle size of from 0.2 to 0.5 µm.

34. The process according to claim 1, wherein the mineral material and the polysaccharide material comprising one or more polysaccharides are independently coated onto the substrate and/or the mineral material pre-coat, respectively, in one or several layers.

35. The process according to claim 1, wherein the pre-coat layer contains from 5 gm$^{-2}$ to 40 gm$^{-2}$ of mineral material.

36. The process according to claim 1, wherein the pre-coat layer contains from 7 gm$^{-2}$ to 30 gm$^{-2}$ of mineral material.

37. The process according to claim 1, wherein the pre-coat layer contains from 8 gm$^{-2}$ to 25 gm$^{-2}$ of mineral material.

38. The process according to claim 1, wherein the pre-coat layer of mineral material substrate is coated with 0.5 gm$^{-2}$ to 20 gm$^{-2}$ of the polysaccharide material.

39. The process according to claim 1, wherein the pre-coat layer of mineral material substrate is coated with 1 gm$^{-2}$ to 15 gm$^{-2}$ of the polysaccharide material.

40. The process according to claim 1, wherein the pre-coat layer of mineral material substrate is coated with 2 gm$^{-2}$ to 11 gm$^{-2}$ of the polysaccharide material.

41. The process according to claim 1, wherein the pre-coat layer of mineral material substrate is coated with 3 gm$^{-2}$ to 5 gm$^{-2}$ of the polysaccharide material.

42. A coated substrate obtained by the process according to claim 1.

43. The coated substrate according to claim 42, wherein the polysaccharide material is partially or completely absorbed by the mineral material pre-coat.

44. The coated substrate according to claim 42, wherein one part of the polysaccharide material covers the mineral material and the rest of the polysaccharide material is absorbed into the mineral material pre-coat.

45. The coated substrate according to 42, that is coated paper.

46. A packaging material, composite, barrier layer, printing surface, strengthening surface or binder comprising the substrate according to claim 42.

\* \* \* \* \*